Dec. 21, 1965    J. J. BLACK ETAL    3,224,085
METHOD OF WELDING A JOINT
Original Filed April 28, 1960    7 Sheets-Sheet 1
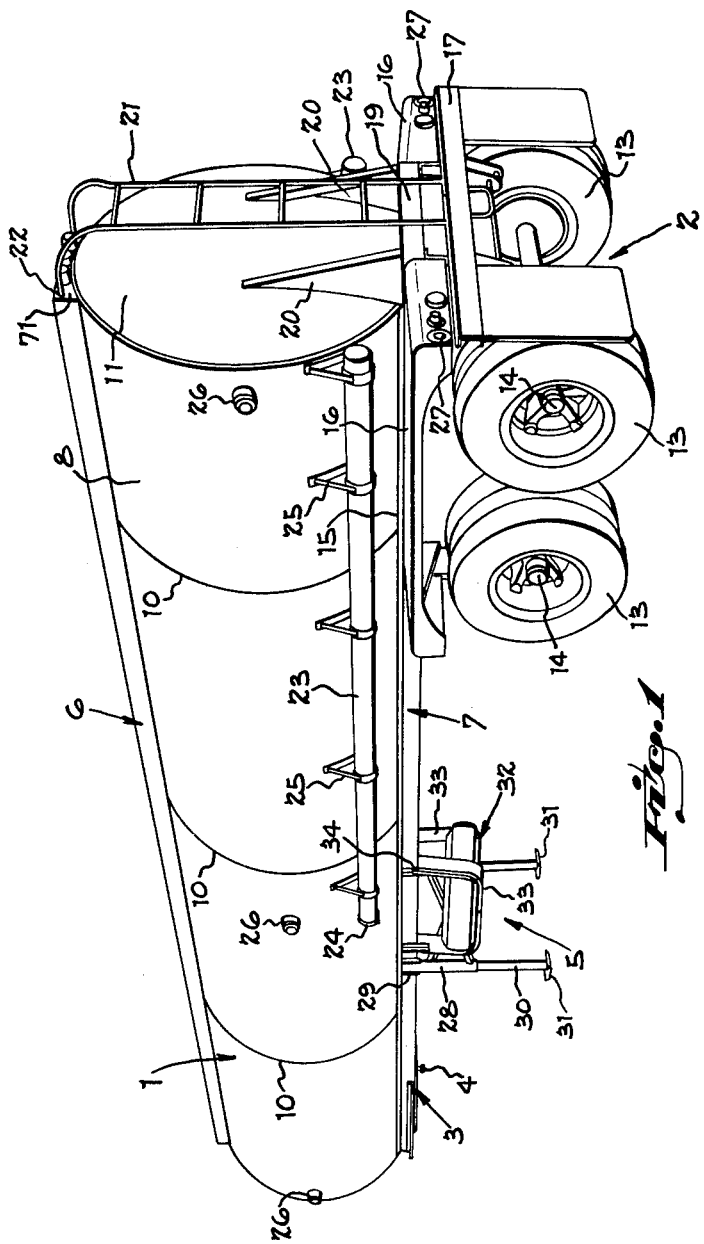
INVENTORS.
James J. Black.
BY Francis V. Roy.
Wood, Herron & Evans.
ATTORNEYS.

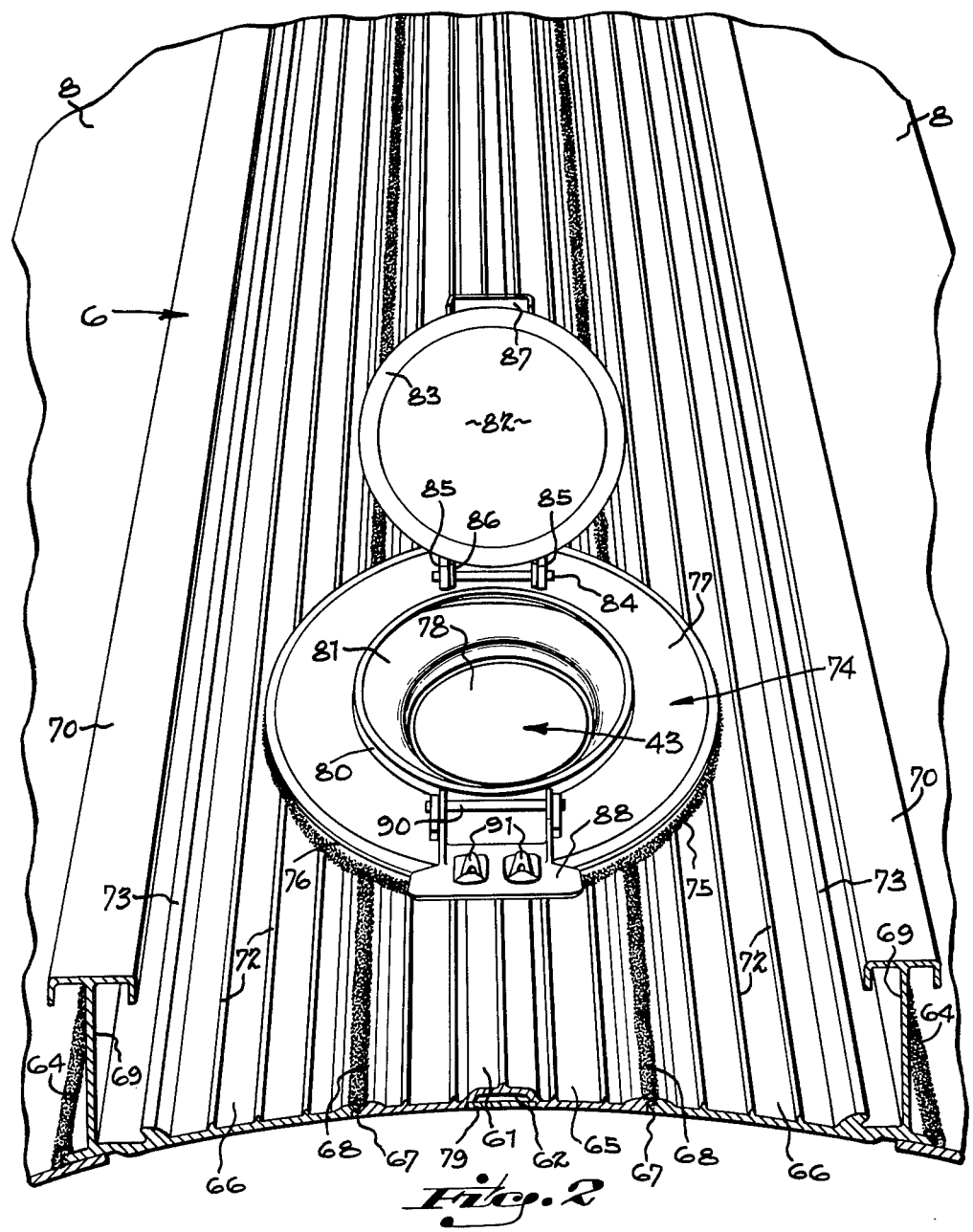

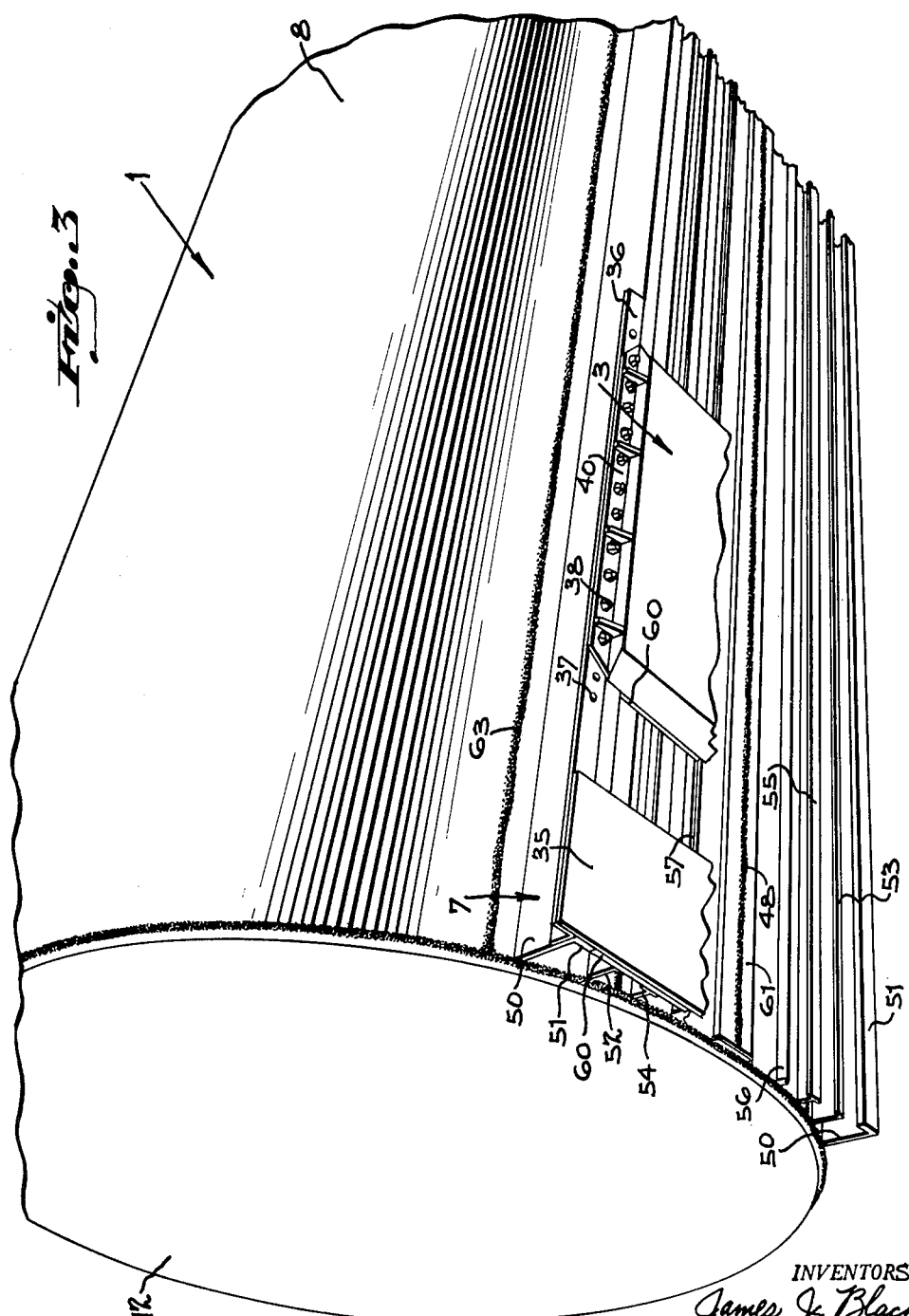

Dec. 21, 1965    J. J. BLACK ETAL    3,224,085
METHOD OF WELDING A JOINT
Original Filed April 28, 1960    7 Sheets-Sheet 4
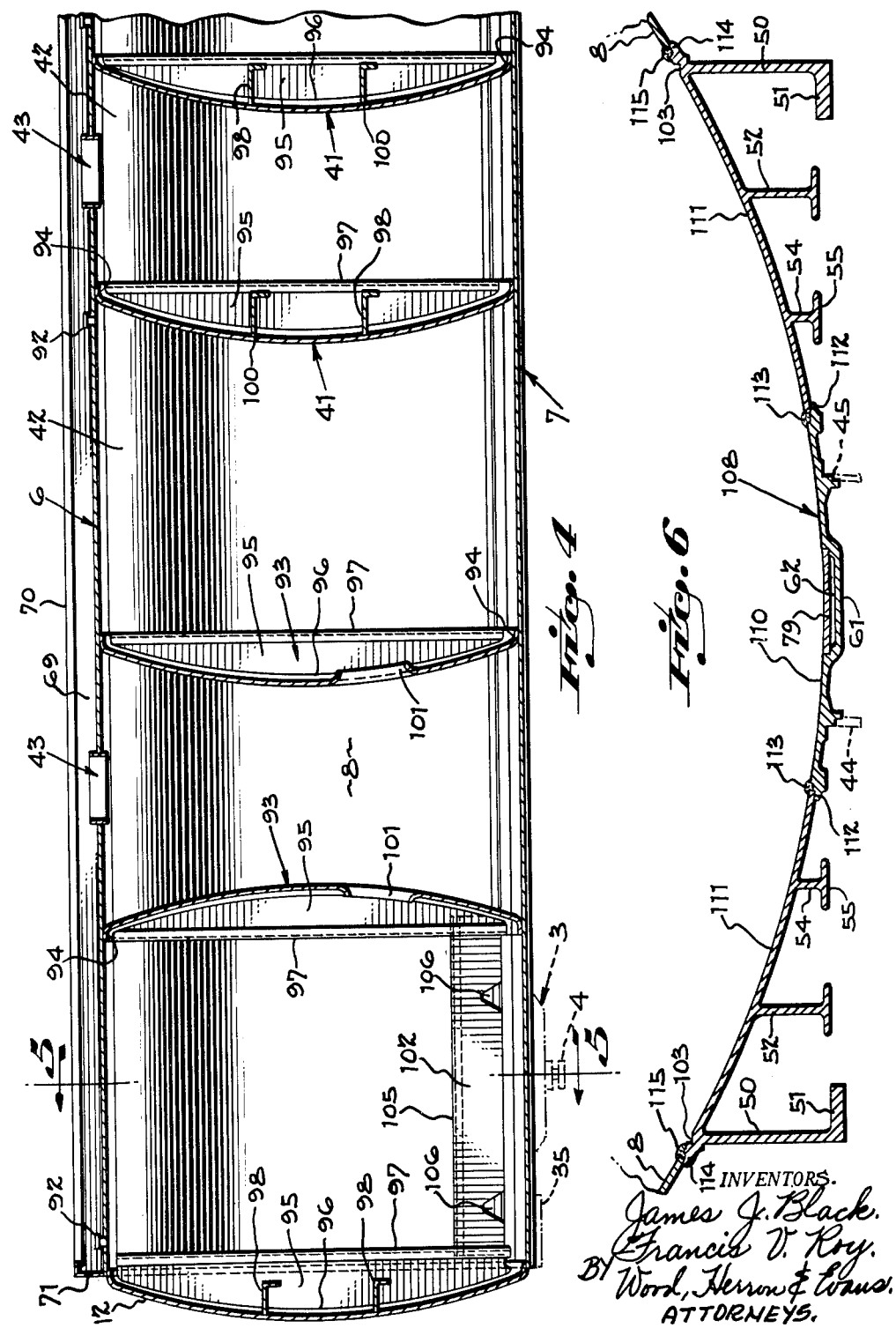

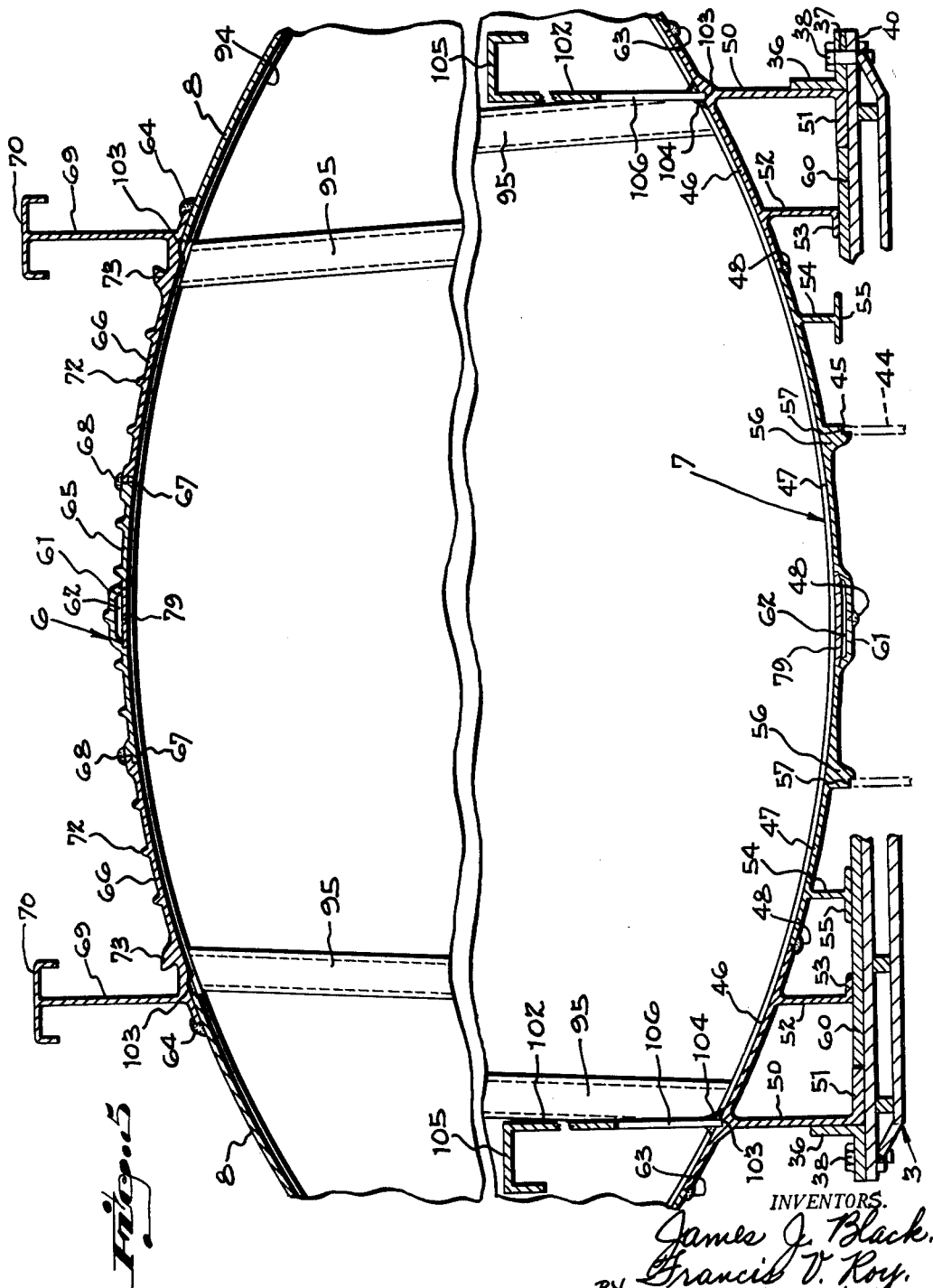

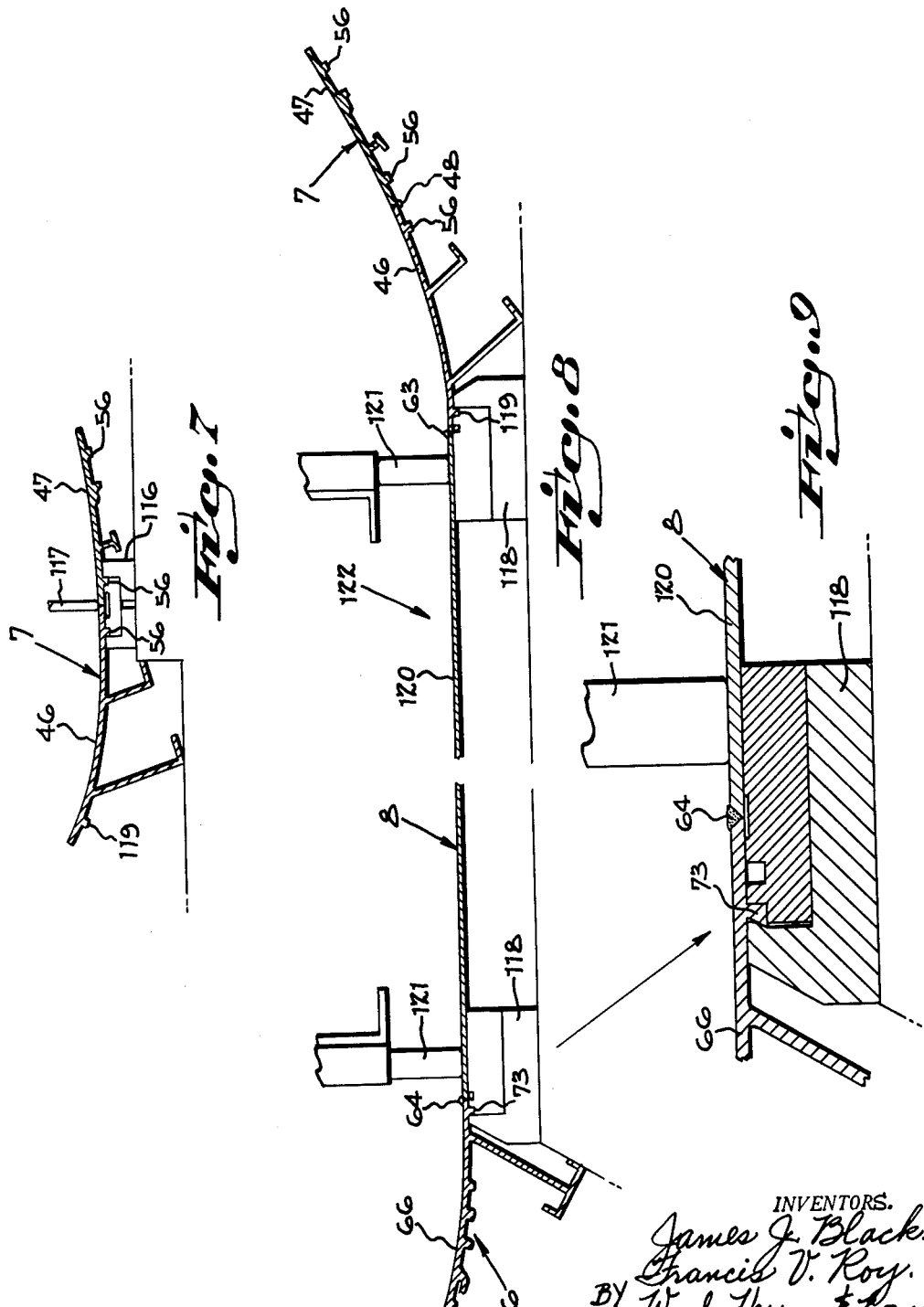

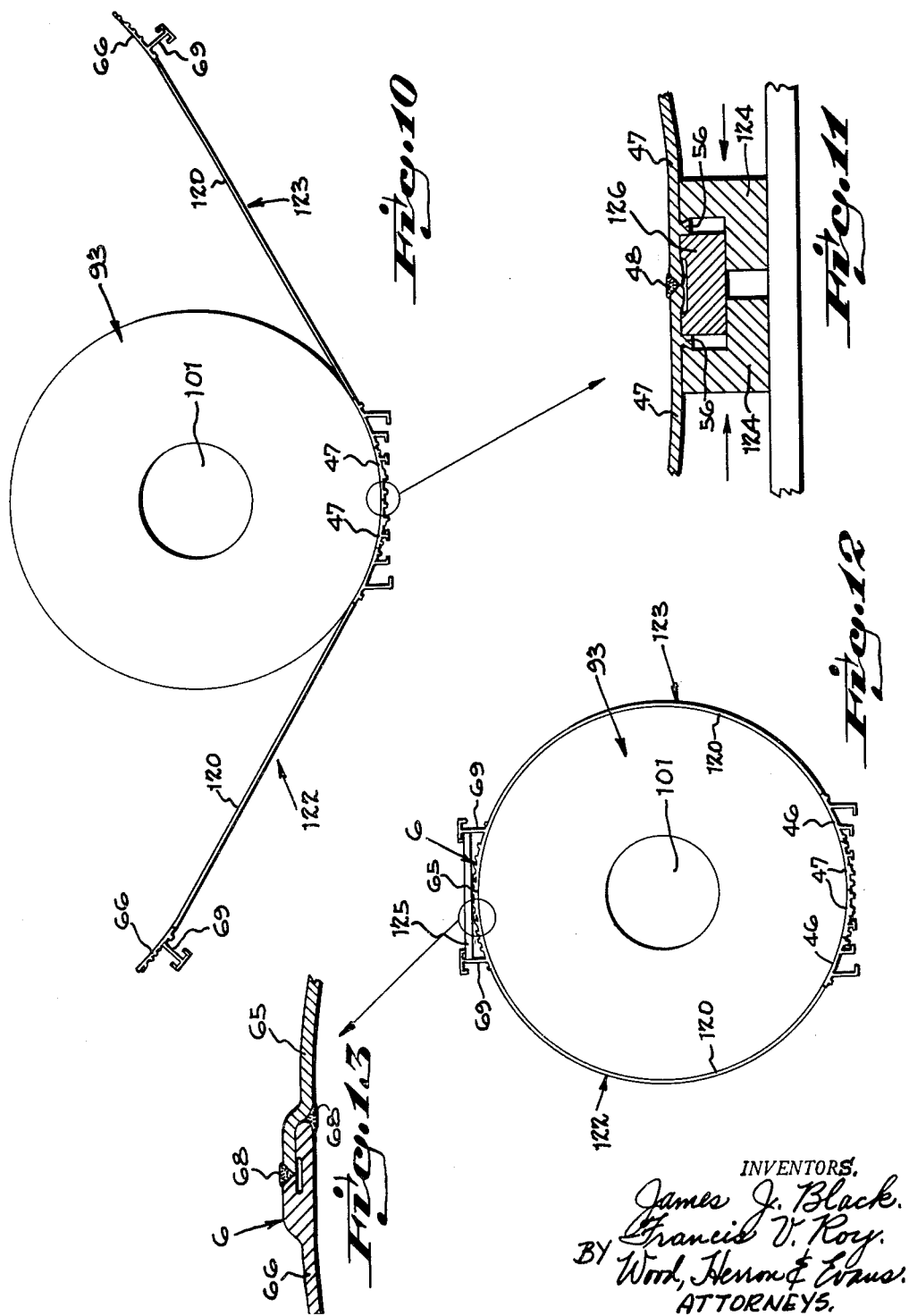

United States Patent Office 3,224,085
Patented Dec. 21, 1965

3,224,085
METHOD OF WELDING A JOINT
James J. Black and Francis V. Roy, Cincinnati, Ohio, assignors, by mesne assignments, to Pullman Incorporated, a corporation of Delaware
Application Oct. 8, 1962, Ser. No. 233,174, now Patent No. 3,187,425, dated June 8, 1965, which is a division of application Ser. No. 25,324, Apr. 28, 1960, now Patent No. 3,131,949, dated May 5, 1964. Divided and this application Sept. 14, 1964, Ser. No. 402,375
1 Claim. (Cl. 29—493)

The present application is a division of application Serial No. 233,174 filed October 8, 1962, now Patent No. 3,187,425, granted June 8, 1965, which is a division of application Serial No. 25,324, filed April 28, 1960, now Patent No. 3,131,949, granted May 5, 1964.

This invention relates to the construction of vessels for storing or transporting bulk lading, for example liquids such as gasoline or fuel oil, or pulverulent solids, such as cement, or the like. The present vessel or tank structure is intended as a transportable freight container, or for highway vehicles such as trucks and trailers, or for railway tank cars. A highway semitrailer, of the type extensively used in the highway transport of petroleum products from the distributor to the retailer, has been selected to illustrate the principles of the invention.

One of the primary objectives of the present invention has been to provide an improved method of fabricating a light weight, self-sustaining vessel having a length substantially greater than its width or diameter, and of simplified construction, adapted to span a pair of spaced supports or to span running gear at opposite ends of a vehicle without requiring any external bridging structure or to rest upon its own bottom structure as a bulk container. As applied to a semitrailer, the forward end of the vessel includes an upper fifth wheel which is supported upon the mating lower fifth wheel of the tractor, while the rearward end is supported upon the running gear including a spring suspension having road wheels.

A further important objective of this invention has been to provide a vessel of the character described which is not only self-sustaining and sufficiently rugged to withstand the shocks, twisting forces and severe loads to which it may be subjected in roadway or railway transportation, but which nevertheless is of light weight in relation to volumetric capacity, such that a high tare to gross ratio is obtained and the weight cost of returning empty vessels is reduced. In this respect, the invention contemplates a container which may be fabricated rapidly and inexpensively from aluminum or similar light weight metals, including structural sections which are in the form of extruded aluminum sections adapted for welding interconnection either with one another or with light weight sheet metal as the case may be.

Described generally, a vessel constructed according to the present method comprises longitudinal upper and lower beams in the form of channel-like longitudinal extruded metal sections formed of aluminum or other light weight metal, the lower extrusion acting principally as the spine or beam component of the tank or vessel while the upper extrusion coacts with the lower extrusion principally in compression in resisting the forces developed by the weight load of the vessel and its cargo during road transport. Stiff vertical members, constituting load transferring and sustaining means, reside in welded interconnection with the opposite endwise portions of the extruded metal sections at top and bottom and may also constitute the end closures of the vessel. By virtue of this trussed arrangement, of rigid extrusions, a vessel 40 feet in length is reliable as a semitrailer or other vehicle, while the weight of the assembly is substantially less than conventional structures, thereby substantially increasing the permissible pay load which may be transported.

In the disclosure which has been selected to illustrate the present method, the vessel is preferably cylindrical in cross section and the upper and lower longitudinal extruded metal sections are generally of arcuate configuration in cross section, corresponding to the radius of the shell. The lower section of the vessel comprises one or a plurality of extruded metal sections extending continuously throughout substantially the entire length of the vessel and serves as the bottom closure thereof as well as a stiff longitudinal beam upon which the vessel may rest or be supported and which in turn sustains at least a part of the static and dynamic loading of the vessel. In the preferred construction, the bottom beam includes side rails projecting downwardly along opposite edgewise portions of the extruded metal section or assembly, while additional strength is conferred by a series of intermediate ribs located intermediate the side rails. The side rails furnish a convenient base for the vessel in its use as a container whether or not ribs intermediate the side rails are employed.

The lower extrusion, whether as one longitudinal piece or as an assembly of longitudinal pieces in side-by-side relationship, as is preferred, is generally in the form of a circular or ovoid segment in cross section and is capable of resisting longitudinal deflection particularly by virtue of the side rails and intermediate ribs which project laterally from the general plane of configurations of the extrusion throughout its length.

Cooperating structurally with the bottom beam as just described, the top beam preferably comprises one of a plurality of extruded metal sections including integral laterally projecting stiffener ribs and is also generally in the form of a circular or ovoid segment so as to constitute the top closure portion for the vessel. This beam, like the bottom beam, runs continuously throughout substantially the entire length of the vessel in generally coextensive but vertically spaced relation to the bottom beam.

When utilized as a semitrailer, the fifth wheel is mounted directly beneath the side rails at the forward portion of the tank, while the running gear or undercarriage similarly is mounted directly beneath the side rails at the rearward portion of the tank. When utilized as a railway transport vessel, the opposite end portions of the side rails likewise may be mounted directly upon the longitudinally spaced trucks or running gear of the vehicle.

The bottom beams are interconnected for structural coaction or load transfer from one to the other by stiffener members welded to the respective endwise portions of the upper and lower beams which members additionally constitute end closures for the vessel in the preferred construction. For example, if the vessel is to be of circular or ovoid form in cross section, then the end members are of such contour. Their desired stiffness is achieved either by dishing such members or by structural reinforcement thereof or both as desired.

In assembling the vessel according to the present method, the extruded metal sections of the lower extruded member are assembled and clamped, then joined by welding their longitudinal adjoining edges together. The edges of a pair of side wall panels, in substantially flat condition, are then welded to the side edges of the lower extruded section (which is now welded longitudinally) to form the shell portion of the vessel. Respective half sections of the upper extruded metal section are then welded to the outer or free edges of the sheet metal panels.

The present invention is directed specifically to the method of welding the extrusions to one another.

In the preferred method of fabrication, the bulkheads and baffles are located at spaced points along the length of the lower extrusion and welded in place, thereby to serve collectively as a core which delineates the contour, in cross section of the vessel. After this operation, the preassembled side wall panels, including the sections of the top extrusion, are wrapped around the bulkheads and baffles to form the cylindrical shell, then the sections of the top extrusion are welded longitudinally along their lines of abutment to complete the assembly. Prior to this welding operation, suitable clamping fixtures are also applied to the sections of the upper extrusion to force the sections under pressure into engagement with one another, thus drawing the side wall panels under tension about the internal components of the vessel.

An important commercial advantage which is provided by this construction, aside from its light weight and rigidity, resides in the fact that the welds subjected to the major loads extend longitudinally of the vehicle at areas of the metal members which are offset laterally from areas of maximum stress. Thus, in the present construction, the longitudinal edgewise portions of the upper and lower beams are subjected to the highest fiber stressing, either as tensional or compressional forces as the case may be. Welding of the metal, particularly in the case of the light weight metal or alloys inevitably impairs whatever additional strength may have been imparted to the metal particularly by the original temper or other treatment thereof. In the present method of construction, longitudinal seam welds readily may be located at areas of the extruded metal sections which are offset from the areas of maximum stress. In this manner, the economics of welding may be realized without sacrifice of strength at critical areas and without the necessity of employing metals sufficiently thick to offset strength lost as a result of welding heat. Because most of the welds in the vessel made according to this invention extend longitudinally of the vessel, as continuous seam welds, the vessels may be fabricated most inexpensively by automatic linear seam welders.

A further distinct advantage of the construction is that the longitudinal welding, or more specifically, the elimination of welding along a multiplicity of intersecting lines eliminates the buckling which is commonly encountered in the construction of conventional tanks and eliminates the necessity of pounding out heat buckled sheets as is typically required in the fabrication of conventional tanks or the like.

As noted above, the vessel is provided with a series of reinforced and reinforcing bulkheads spaced along the length of the vessel and joined by welding to the upper and lower extrusions, and also the shell of the vessel, as desired. The bulkheads delineate individual compartments located along the length of the vessel. Each compartment, in turn, preferably is subdivided by one or more baffles which are similar to the bulkheads, except that each baffle includes an opening through which a man may pass when it is necessary to service the interior of the vessel. The exterior shell of the vessel may comprise respective sheet metal panels bent or stretch-formed to shape and joined by welding to the edges of the upper and lower extrusions along opposite sides of the tank assembly. The side wall panels may be in the form of individual sections along the length of the tank, in which case they may be pre-joined by vertical welded seams extending from one longitudinal edge to the other, or each side wall may be a one-piece full length panel curved to the radius of the bulkheads and baffles and joined by longitudinal seam welding to the respective edges of the upper and lower extrusions. By virtue of the integral side rails of the upper and lower extrusions, the longitudinal, lateral and twisting forces which act upon the top and bottom extrusions during transport are absorbed in part by the stiff extrusions and also through interconnection of the ends, supplemented as desired by the bulkheads; hence, twisting and yielding of the upper and lower extrusions are eliminated so as to preserve the welded seams of the shell and prevent buckling, thereby to prevent failure of the tank structure or leakage even after prolonged heavy duty service.

In order to load the vessel, the upper extruded section includes manholes or hatches which provide communication with the several compartments which are delineated by the internal bulkheads. The manholes permit the compartments to be loaded by means of overhead filler pipes according to conventional practice.

The compartments are drained by way of a sump or trough extending along the lower extrusion either as an integral formation thereof or joined thereto by welding. Each compartment includes a valved opening communicating with the sump, permitting selective unloading of the compartments by gravity.

The various features and advantages of the invention will be more readily apparent to those skilled in the art from the following detailed description of a preferred embodiment of the invention taken in conjunction with the drawings.

In the drawings:

FIGURE 1 is a perspective view illustrating a semi-trailer embodying the extruded tank construction of the present invention.

FIGURE 2 is an enlarged fragmentary perspective view detailing the longitudinal top extrusion of the tank and showing one of the manhole covers in open position.

FIGURE 3 is a fragmentary perspective view of the forward portion of the tank and particularly illustrating the longitudinal bottom extrusion of the tank.

FIGURE 4 is a fragmentary longitudinal sectional view of the forward portion of the tank, showing the internal construction thereof.

FIGURE 5 is an enlarged fragmentary cross sectional view taken along line 5—5 of FIGURE 4, detailing the longitudinal extrusions at the top and bottom portions of the tank.

FIGURE 6 is an enlarged cross sectional view showing a bottom extrusion of somewhat modified construction.

FIGURE 7 is a fragmentary detail view showing the mode of assembling the lower extrusion of a modified tank structure.

FIGURE 8 is a diagrammatic view showing one of the steps in assembling the full length wall panel of the modified tank, wherein the upper and lower extrusions are welded to the wall panel to form one-half of the tank.

FIGURE 9 is an enlarged fragmentary view taken from FIGURE 8, detailing the clamping fixture which is utilized in welding the upper extrusion to the edge of the wall panel.

FIGURE 10 is a diagrammatic view showing the step of assembling the two prefabricated wall panels and extrusions.

FIGURE 11 is an enlarged fragmentary view showing the clamping fixture which is utilized in joining the lower extrusions of the two prefabricated wall panel sections.

FIGURE 12 is a diagrammatic view showing the assembled tank with the upper extrusion sections welded together.

FIGURE 13 is an enlarged sectional view taken from FIGURE 12, detailing the welded lap seam joining the upper extrusion sections of the assembled tank.

Referring to the drawings, FIGURE 1 discloses a semi-trailer which has been selected to illustrate a vessel constructed according to the present method, however, as noted earlier, the vessel or tank structure is also alternatively intended for general storage and for railway tank car service in the transportation of bulk materials. Described generally with reference to FIGURE 1, the vessel structure, indicated generally at 1, is in the form of an elongated horizontal cylinder which is self-supporting and hence does not require a vehicle frame or understructure. The rearward end of the vehicle is provided with running gear, indicated generally at 2, and the forward end includes a fifth wheel indicated generally at 3. The fifth wheel is arranged to be supported upon the mating fifth wheel of the tractor (not shown) and is provided with a king pin 4 which establishes an articulated draft connection with the coupling jaws of the tractor fifth wheel. During roadway transport, the forward end of the tank structure is supported upon the tractor fifth wheel while the rearward end is supported upon the running gear. When the trailer is uncoupled from the tractor as shown in FIGURE 1, the forward end of the vehicle is supported upon the landing gear or props indicated generally at 5.

When the vehicle is coupled to the tractor, the tank is supported at opposite ends upon the fifth wheel 3 and running gear 2, such that the vessel itself acts as a hollow beam in carrying the weight load of the cargo therein. Longitudinal stiffness sufficient to resist these forces is imparted to the tank by the upper and lower longitudinal extrusions, which are indicated generally at 6 and 7.

The props, road wheel assembly, fifth wheel and other elements adapting the vessel of the present invention to roadway service as a semitrailer in and of themselves may be conventional, but the manner in which they are applied to the light weight vessel, such that the metal of the latter at the areas of attachment does not become ruptured or torn through over-stressing is of particular importance in this type of service. Therefore, such elements are described in some detail in relation to the extruded metal section structure and other features of the present invention which collectively provide a vehicle which is fully reliable in service.

*General arrangement*

According to the present disclosure, the tank is of cylindrical form, comprising side walls 8—8 formed of light sheet metal which are longitudinally welded at top and bottom to the upper and lower extrusions, as described later in detail. In the form shown in FIGURE 1, the sheet metal walls are of sectional construction, the several sheets being joined by welding as at 10 along the length of the tank structure. An end wall 11 forms the rearward end of the tank (FIGURE 1) and a similar end wall 12 (FIGURE 4) is provided at the forward end of the tank. The tank is divided longitudinally into a series of individual compartments by means of internal bulkheads as explained later in detail.

The running gear 2 is of the tandem type, comprising two sets of road wheels 13—13 mounted upon respective axles 14—14 extending parallel with one another. The axles 14 are connected to a tandem spring suspension (not shown), arranged to equalize the weight load which is imposed upon the two sets of wheels 13—13. The spring suspension is mounted upon an undercarriage including side plates 15—15 which extend downwardly from the lower extrusion 7 at opposite sides thereof. The tandem springs, radius rods and other components (not shown) are joined to the lower edges of the side plates 15—15 and thus support the rearward portion of the tank structure with respect to the roadway.

As shown in FIGURE 1, the rearward portion of the semitrailer includes fenders 16—16 projecting outwardly on opposite sides from the lower extrusion 7 and overhanging the road wheels. A channel-shaped member 17 extends across the rearward end of the vehicle and has its opposite ends secured to the fenders for stiffening purposes. In order to further strengthen the rearward portion of the vehicle, a cross piece 19 extends across the rearward end of the lower extrusion (FIGURE 1) adjacent the end of the tank, and a pair of triangular brackets 20—20 rise upwardly from the cross piece 19 and are joined by welding to the end wall 11 of the tank.

In order to permit the operator to climb to the top of the tank for loading and maintenance, there is provided a ladder 21 which extends upwardly from the channel member 17. The ladder has its upper end joined as at 22 to the upper extrusion 6. The upper extrusion is provided with a plurality of manholes, as explained later, which communicate with the interior of the individual vessel or compartments thereof.

Flexible delivery conduits (not shown) for connection with discharge pipes, are carried in respective storage tubes 23—23 (FIGURE 1) secured to the tank at opposite sides. Each tube 23 includes a closure cap 24 which is shifted to an open position for inserting or removing the conduit. Each storage tube 23 is secured in place by a series of brackets 25 welded to the side wall of the tank.

For safety purposes, side walls of the tank at opposite sides above the storage tubes 23, are provided with the usual series of signal lamps 26 and the rearward end of the fenders 16 are provided with the usual tail lights, stop lights and turn signals, as indicated collectively at 27.

The landing gear, previously indicated at 5 (FIGURE 1) comprises individual telescopically arranged posts extending downwardly from the lower extrusion at opposite sides. Each post comprises an upper section 28, joined as at 29 to the lower extrusion 7, and a lower section 30 telescopically interfitting the upper section, each lower section including at its lower end a foot 31 which rests upon the ground when the semitrailer is uncoupled from the tractor. When the forward end of the semitrailer is coupled to the tractor, the lower sections 30 at opposite sides may be elevated manually from the position shown, so as to provide adequate clearance during road transport. Since the landing gear is of conventional construction, the details have been omitted from the disclosure.

Immediately to the rear of the landing gear 5, there is provided a spare tire carrier, indicated generally at 32. In general, the carrier comprises a pair of U-shaped hangers 33—33 depending downwardly from the lower extrusion 7 at opposite sides, the upper ends of each hanger being welded or otherwise secured, as at 34 to the extrusion 7. The tire carrier 32 is generally conventional and therefore has not been illustrated in detail.

The fifth wheel 3 preferably is of the low level type shown in the patent to James J. Black, No. 2,841,415. In general, the fifth wheel is located beneath the lower extrusion 7 at the forward end of the tank, as indicated in broken lines in FIGURE 4. Forwardly of the fifth wheel there is provided a skid plate 35, also attached to the lower extrusion, as indicated in FIGURE 4. The tractor (not shown) is provided with an inclined skid plate which is inclined downwardly and rearwardly from the rearward end of the tractor. When the tractor is backed into coupling position, the inclined tractor skid plate slidably engages the skid plate 35 and thus elevates the forward end of the semitrailer and fifth wheel 3 sufficiently to permit the tractor fifth wheel to slide beneath it, thereby to establish a coupling engagement with the king pin 4.

As detailed in FIGURE 5, the fifth wheel 3 is secured in place beneath the lower extrusion 7 by means of a pair of angle irons 36—36 which are attached as by welding to the opposite sides of the extrusion 7. Each angle iron 36 is provided with a series of holes 37 for the reception of screws 38 which pass through the flange of the angle iron and through a flange 40 along opposite sides of the fifth wheel. In order to permit the location of the fifth wheel to be varied longitudinally (FIGURE 3) the angle irons 36 at opposite sides, extend lengthwise beyond opposite ends of the fifth wheel and include additional apertures 37 for the reception of the screws 38. This arrangement permits the fifth wheel to be located selectively along the forward portion of the tank, thereby to vary the effective wheel base of the vehicle. It is to be noted that the weight load of the tank is transmitted directly from the lower extrusion 7 to the fifth wheel 3 at the forward end of the tank, and from the extrusion to the running gear 2 at the rearward end of the tank.

As indicated in FIGURE 4, the tank structure may be provided with a series of internal bulkheads indicated generally at 41, which if imperforate delineate a series of compartments 42 along the length of the tank. Each compartment is filled through an individual manhole, indicated generally at 43, which is formed as part of the upper extrusion 6. The compartments 42 are drained by gravity through a trough or channel way which is formed as an integral part of the lower extrusion and which through suitable openings may communicate with a drainage sump indicated diagrammatically at 44 in FIGURE 6. The sump comprises a generally U-shaped elongated casting having its upper edges welded as at 45 (FIGURE 6) to the upper extrusion so as to form a closed passageway leading to outlet fittings. The sump 44 preferably is of one-piece construction, having a length sufficient to communicate with the several compartments of the series and being provided with internal separators arranged, if desired, to permit the contents of each compartment to be delivered individually to the outlet fittings at the discharge station. Since the sump and valve systems do not form a part of the present invention, they have been omitted from the disclosure.

Vessel structure

As best shown in FIGURES 3 and 5, the lower or bottom extrusion 7 comprises four full length sections welded together longitudinally to form a one piece beam. In the form illustrated, the extrusion is made up of a pair of side or outer sections 46—46 and a pair of inner sections 47—47. These sections are joined together along the longitudinal weld lines 48, in symmetrically opposite relationship. It will be understood that the entire extrusion may be of one piece fabrication so as to eliminate such welding operations; however, at the present time, they are made sectional because of limitation in the size of the available extrusion presses.

Described with reference to FIGURE 5, each outer extrusion includes a side rail or L-shaped flange 50 having an inturned foot 51; the flange or rail 50 forms a load bearing frame along opposite sides of the assembled extrusion 7. Adjacent the rail 50, each outer section 46 includes a secondary L-shaped flange 52 provided with a foot 53. Each inner section 47 is provided with a T-shaped flange 54 having a head 55 residing in a plane common to the foot 53 of flange 52. Adjacent each T-shaped flange, there is provided a longitudinal rib 56.

During assembly and welding of the lower extrusion 7, the inner sections 47—47 may be held in assembly by suitable clamping mechanism which engages the ribs 56—56 so as to hold the sections in abutment while the central weld line 48 is applied. The ribs 56—56 are rabbeted longitudinally as at 57 to provide nested engagement with upper edges of the drainage trough, as previously indicated at 44.

As viewed in FIGURE 3, the several ribs and flanges of the longitudinal sections extend for the full length of the extrusion and thus create a rigid beam extending from the forward to the rearward end of the tank. The side plates 15—15 of the running gear are welded directly to the foot 51 of the side rail flange 50 opposite sides of the extrusion. The side plates 15 are provided with vertical reinforcements which stiffen the structure. As indicated in FIGURE 5, the angle irons 36—36, which mount the fifth wheel 3, are also attached to the L-shaped flange 50 at opposite sides of the extrusion. It will be noted (FIGURE 5) that a filler plate 60 is interposed between the fifth wheel and the flanges 52 and 54, such that the weight load is distributed to the several longitudinal flanges or ribs of the extrusion. It will also be noted that the cross piece 19 (FIGURE 1) at the rearward end of the tank has its opposite ends joined by welding to the L-shaped side rail flanges 50—50, so as to complete the framing structure. A similar cross piece (not shown) preferably extends across the forward end of the tank.

The lower extruded section 7 is provided with a central channel way or depression 61 (FIGURE 5) which extends longitudinally for the full length of the tank. The channel way is formed by the outwardly displaced marginal portions of the adjoining inner sections 47, which are welded longitudinally, as previously noted at 48, along the center of the tank. The edge of the circular bulkhead 41 (FIGURE 4) opens the channel way 61 (FIGURE 6) of the lower extrusion and thus delineates space 62 beneath the lower edge of the bulkhead. In order to seal the compartment, the space 62 is blocked off by a suitable insert which is placed in the channel way below the bulkhead and welded in place.

The upper extrusion 6, as explained later, is also provided with a longitudinal channel way which is displaced upwardly from the circular contour of the tank assembly. The upper channel way delineates a space above the upper edge of the bulkhead 41, (FIGURE 4) which is also sealed off by a suitable insert which is welded in place.

As described later in detail, each tank compartment 42 is sub-divided by one or more circular baffles which are generally similar to the bulkheads 41, and which prevent surging of liquid tank contents. As best shown in FIGURE 5, the upper and lower channel ways 61 are each spanned by a series of bridge plates 79 interfitting respective grooves or rabbets formed along opposite sides of the channel ways, the inner surface of the bridge plates being flush with the surface of the extrusions to provide a continuous weld about each baffle, as explained later. It will be noted that the channel ways of the upper and lower extrusions delineate passageways above and below each baffle so as to form a gas vent across the upper edge of the baffles and a liquid passageway below the lower edge of the baffle to provide complete drainage of liquid from each compartment.

Again referring to FIGURE 5, the sheet metal panels which form the side wall or shell 8 at opposite sides of the tank, have their lower edges welded as at 63 to the marginal edge of the outer extruded section 46 at opposite sides. As noted earlier, the tank is cylindrical, the assembled lower extrusion being arcuate in cross section, corresponding to the radius of the side wall 8. The radius of the assembled tank shell is determined by the circular bulkheads, as previously indicated at 41, the side wall panels 8 being fitted around the bulkheads during assembly, as explained later.

The lower extrusion, in general, forms the segment of a circle, curving downwardly between the side rails 50—50 which with its integral side rails and ribbing constitutes a rigid beam structure. The arcuate shape of the extrusion, combined with the side rails 50 creates rigid beams capable of imparting longitudinal stiffness to the tank. In addition, the side rails, in combination with the bulkheads and upper extrusion, are capable of resisting twisting forces which are developed during road transport of the vehicle.

The upper edges of the side wall panels 8 at opposite sides are welded as at 64—64 to the opposite side edges of the upper extrusion 6. This extrusion also consists of longitudinal full length sections joined together by longitudinal welds. Thus, in the form shown in FIGURE 5, the upper extrusion comprises a central section 65, and a pair of outer sections 66—66 integral therewith. The adjoining edges of the sections are rabbeted longitudinally as at 67 to provide mating lips which align the adjoining sections, the sections being welded as at 68 along these joints. In order to impart longitudinal stiffness to the upper extrusion 6, there is provided on each outer section 66, a respective T-shaped flange 69 having a head 70 thereby forming a beam which is highly resistant to lateral forces so as to prevent the flanges from warping under heavy loads or twisting forces. As indicated at 6 in FIGURE 1, the opposite ends of the flanges 69—69 are joined by cross flanges 71—71 of similar cross section, at the opposite ends of the tank.

In addition to the flanges 69, the section 65 and 66 are provided with parallel ribs 72 (FIGURE 5) which impart additional stiffness to the assembly. The ribs 72 have sharp outer edges presenting an anti-skid top surface which prevents slippage when the operator climbs upon the tank for loading or maintenance. If desired, the upper edge of each rib 72 may be cross-notched at spaced intervals to increase the non-skid character of the extrusion surface.

The upper extrusion, similar to the lower, is generally in the form of a circular segment, as viewed in FIGURE 5. The side flanges 69, similar to the lower flanges or side rails 50, aid in imparting longitudinal stiffness to the extrusion and also, in combination with the lower extrusion and reinforced bulkheads, resist twitching forces which are developed during road or rail transport of the tank vehicle. Adjacent each T-shaped flange 69, the extruded section includes an outwardly turned rib 73 extending parallel with the ribs 72. The ribs 73 imparts additional stiffness to the extruded section along its marginal side portions.

As noted earlier, the upper extruded section 6 includes a central channel way 61 (FIGURE 5) which is displaced outwardly with respect to the circular contour of the tank, similar to the channel way of the lower extrusion 7. The upper channel way delineates an opening 62 above the edge of each bulkhead 41 and baffle 93 (FIGURE 4). In the case of the bulkheads, the space 62 is blocked off by a suitable insert interfitting the space 62, while in the case of the baffles, the space 62 is left open to permit the passage of gas across the upper edge of each baffle.

As best shown in FIGURE 2, the manholes, previously indicated at 43, which communicate with the individual compartments of the tank, are formed in the upper extrusion 6. Each manhole is in the form of a cylindrical collar assembly 74 (FIGURE 2) which is welded as at 75 about an opening formed in the assembled extrusion 6. It will be noted that the cylindrical collar assembly 74 and its opening extends across the central extruded section 65 and intercepts the marginal portions of the outer extruded sections 66. The collar assembly 74 reinforces the extrusion across the opening, the arrangement being such that forces acting upon the extrusion are resisted by the collar as a bridge or continuation of the extrusion, the load resistance of the top extrusion being substantially equal for the full length of the tank.

Described in detail, the collar assembly 74 comprises a cylindrical rim 76 which has its outer edge welded to the extruded sections, as previously indicated at 75. The rim 76 includes an annular top plate 77 joined to its upper edge. The central opening 78 of annular plate 77 is delineated by a cylindrical flange 80 projecting upwardly from plate 77. The opening 78 is delineated by an internal funnel-shaped cup 81, which converges downwardly and inwardly from the circular flange 80.

The collar assembly 74 is provided with a hinged cover 82 having a circular gasket 83 adapted to seat against the circular flange 80 when in closed position. As shown in FIGURE 2, cover 82 is hingedly carried by a pin 84 which is mounted in lugs 85—85 rising from the collar assembly 74. The pin 84 passes through the lugs 86—86 forming a part of the cover 82, thus providing a hinged connection between the collar assembly and cover.

The swinging portion of cover 82 is provided with a latch piece 87 which is engageable with a coacting latching device 88 pivotally connected as at 90 to the collar assembly. When the cover is closed, the latching device 88 may be pivoted to the locking position overlying the latch pieces 87 of the cover. In this position, the detents 91 of the latching device 88 (FIGURE 2) engage the latch piece 87 of the cover to hold the cover in sealing engagement with the circular flange 80. Since the latching mechanism does not form a part of the present invention, the details have been omitted from the disclosure.

As viewed in FIGURE 4, each tank compartment is provided with a vent cap assembly 92. These caps communicate with respective openings formed in the central extruded section 65 and are welded in place. The vent caps 92 are conventional structures and have not been disclosed in detail.

As noted earlier (FIGURE 4), the tank compartments 42, which are delineated by the bulkheads 41, are each provided with one or more internal baffles 93 which are generally similar to the bulkheads. The forward compartment 42, for example, is delineated by the forward end wall 12 and by a forward bulkhead 41, the compartment being sub-divided by two baffles 93—93, the bulkhead, baffles and forward end wall 12 each comprising a circular, dish-shaped sheet metal plate suitably reinforced, as explained below.

Described in detail with reference to FIGURE 5, each bulkhead includes a marginal flange 94 joined by welding to the upper and lower extrusions 6 and 7 and to the sheet metal shells 8 of the tank. It will be noted (FIGURE 5) that the marginal flange 94 of the baffle seats against the bridge plates 79 of the upper and lower extrusions such that the plates 79 make it possible to apply a continuous line of weld joining the flange 94 to the tank components. It has been found in practice that the continuous weld provides a stronger and more durable structure and prevents strains from being imposed upon the bulkheads. Such strains are normally present where the weld is interrupted, and may lead to failure or rupture of the sheet metal bulkhead along a line extending inwardly from the non-welded area. In fabricating the upper and lower extrusions, the bridge plates preferably are welded in place at the points where the baffles are to be located, before the sheet metal shell sections are joined to the side edges of the extrusions.

Each bulkhead is reinforced by a pair of vertical braces 95—95 (FIGURES 4 and 5), each brace 95 being in the form of a flat plate having a curved inner edge 96 corresponding to the concave surface of the bulkhead. The outer edge of each brace 95 is channel-shaped in cross section as indicated at 97 for stiffening purposes. The braces 95 are sprung in place so as to pre-stress the bulkhead for maximum strength; the braces are welded to the bulkheads after being sprung in place and thus provide load transfer members spanning the upper and lower extrusions. In order to locate the upper and lower ends of the braces 95, the upper and lower extrusions are provided with longitudinal internal grooves or notches 103 which are aligned with the side rails or flanges 50 and 69 of the lower and upper extrusions.

Each bulkhead is further stiffened by means of cross pieces 98—98 which are in the form of angle irons. The inner edge of each cross piece 98 is curved so as to seat against the surface of the bulkhead as at 100 while the outer flange of the cross piece is engaged beneath the channel-shaped flange 97 of the vertical stiffeners.

It will be noted in FIGURE 4, that the forward end wall 12 is provided with vertical braces 95 and cross piece 98 similar to the bulkheads. The rearward end wall 11, similarly stiffened, is provided with one additional cross piece 98 to increase the stiffening effect.

As viewed in FIGURE 4, each of the circular baffles 93 is similar to the bulkheads and each includes an opening 101 to provide for the flow of liquid therethrough. Each baffle is provided with a pair of vertical braces 95—95; however, since the baffles are not subjected to heavy loading, the cross pieces 98—98 are omitted. As noted earlier, the channel ways 61 of the lower extrusion provide drainage across the lower edge of the baffle, while the channel way 61 of the upper extrusion provides venting of gas across the upper edge of the baffle.

In order to reinforce the forward end of the tank in the area of the fifth wheel 3 (FIGURES 4 and 5), there is provided a pair of horizontal braces 102 which extend between the forward wall 12 and forward baffle 93. Each brace 102 extends vertically in the plane of the side rail 50 at opposite sides (FIGURE 5) and its lower edge interfits the longitudinal locating groove 103 which is formed in the lower extrusion 7 above side rail 50. The lower edge of the brace 102 is welded as at 104 to the extrusion at opposite sides of the notch. As noted earlier, the grooves 103 also locate the opposite ends of the vertical transfer braces 95, which span the side flanges 50 and 69 of the upper and lower extrusions.

To impart longitudinal and lateral stiffness to the horizontal braces 102, the upper portion of each brace includes a channel-shaped head 105. As viewed in FIGURE 4, the lower portion of each brace 102 is notched as at 106—106 to prevent liquid from being trapped behind the braces when the compartment is drained. It will be noted (FIGURE 5) that forces acting on the side rails 50 are resisted by the braces 102 so as to avoid overstressing or tearing of the vessel structure at its forward load bearing portion.

The rearward portion of the vessel is likewise provided with horizontal braces. These may be identical with the braces 102 and each is similarly welded in place in the plane of the side rail 50 at opposite sides. In this instance the horizontal braces extend for the full length of the rearward compartment 42 and each comprises two longitudinal sections having ends abutting the rearward baffle 93. The rearward stiffeners are adapted to reinforce the rearward load bearing section of the tank in the area carried by the running gear 2.

In fabricating the vessel with sectional side panel sections, the end walls, bulkheads and baffles may be assembled with the upper and lower extrusions and joined by welding so as to form a beam-like frame. Thereafter, the side wall sections, which form the tank shell 8, may be placed in position against the bulkheads and baffles at opposite sides and welded in place, as noted earlier. The vertical welded joints 10 (FIGURE 1) between adjacent side wall sections may be located in alignment with the flanges 94 of the bulkheads and baffles in order to expedite the assembly operations.

From the foregoing, it will be apparent that the lower and upper extrusions coact in tension and in compression to resist the forces tending to cause sag of the loaded vessel structure during transportation of the tank. Moreover, the upper and lower extrusions, through the load transfer interconnection of the bulkheads and baffles, are able to resist twisting forces as well as those acting longitudinally and laterally of the tank structure, such that the extrusions, bulkheads and external shell form a rigid, beam-like assembly. The arrangement is such that the stresses, strains and twisting forces which are developed during transportation of the vessel, are substantially isolated from the welded seams of the tank shell so as to preserve the useful life of the vessel. The light weight tructure thus provided is equal or superior in strength and durability to conventional heavy duty structures, and by virtue of its light weight construction, the permissible pay load is substantially increased.

*Modified lower extrusion*

The lower extrusion which is indicated generally at 108 in FIGURE 6, is similar to the extrusion 7 previously described except that it is formed of three extruded metal sections instead of four. Thus, the extrusion 108 comprises a one-piece central section 110 and a pair of outer sections 111—111. The opposite side edges of the central section 110 are rabbeted longitudinally as at 112 to provide a mating engagement with the edges of the outer sections 111 which are welded thereto as at 113. The outer edge of each section 111 is similarly notched as at 114 to receive the edge of the side wall, which is welded thereto as at 115. This extrusion is also provided with bridge plates 79 to permit continuous welding about the entire periphery of the baffles. The modified structure is provided with L-shaped side rail flanges 50—50 and intermediate flanges 52—52 similar to the assembly shown in FIGURE 5 and is incorporated in the tank structure in a similar manner. The modified assembly creates the same beam effect and provides somewhat simplified fabrication in that the amount of linear welding is decreased.

*Wrap-around shell structure*

FIGURES 7–13 show the several steps involved in fabricating a vessel of slightly modified design in which the shell 8 is in the form of two one-piece side wall panels extending longitudinally for the full length of the tank along opposite sides, as distinguished from the sectional shell structure disclosed above. According to this construction, the full length sheet metal side wall panels and half portions of the upper and lower extruded sections are assembled as two prefabricated units which are subsequently joined lengthwise, wrapped about the end walls and baffles of the tank, then clamped in wrap-around position, under tension if desired, so as to stress the sheet metal shell. After being thus clamped, adjacent edges of the extruded sections, preferably along the top, are permanently joined by continuous longitudinal welds, thereby completing the assembly operation in a simple and rapid manner.

Referring to FIGURE 7, which illustrates the first step of the present method, the outer extruded section 46 and inner section 47, which together form one-half of the lower extrusion 7 (four section extrusion shown in FIGURE 5) are clamped in assembly by a suitable fixture 116, which engages the ribs 56, thus bringing the edges of the extruded sections into abutment. The longitudinal weld, previously indicated at 48, is then applied by the electrode 117, which may be carried by a welding machine arranged to apply a linear weld.

After the two lower extruded sections 46 and 47 are welded (FIGURE 7), the assembled half extrusion is placed in a clamping fixture 118 (FIGURE 8) which engages the rib 119 of the welded extrusion. A full length sheet metal side wall panel 120 is then placed in position upon the fixture 118 with its lower edge in abutment with the edge of the extruded section 7. The marginal portion of sheet 120 is held rigidly in welding position by a clamping plunger 121 (FIGURE 8), then the longitudinal weld 63 is applied to join the edge of the sheet to the extruded section 7.

The upper edge of sheet 120 is joined in the same way to the outer section 66 of the upper extrusion (FIGURE 8). As detailed in FIGURE 9, a second clamping fixture 118 engages the rib 73 of the upper extruded section 6, while a similar plunger 121 clamps the marginal portion of the sheet 120 in abutment with the edge of the extruded section for application of the longitudinal weld 64.

The assembled full length panel 120, combined with the extruded sections 6 and 7 as shown in FIGURE 8, forms substantially one-half of the tank shell, with the exception of the center top section 65 of the upper extrusion which is applied at final assembly. The assembly shown in FIGURE 8 is applied to the left hand side of the tank, as viewed in FIGURE 10, and a second symmetrically opposite panel and extrusion assembly (not shown) is prefabricated in the same manner to enclose the right hand side of the tank. As viewed in FIGURE 10, the left hand assembly of the full length panel and extruded sections is indicated generally at 122, while the right hand assembly is indicated generally at 123.

In the preferred mode of operation (FIGURE 10), the bulkheads and baffles are located along the length of the lower extrusion and welded in place, the bridge plates first being welded across the channel way, as explained earlier. The bulkheads and baffles are thus located along a common horizontal axis and collectively serve as a core which delineates the contour of the tank when the side wall panels are assembled to form the shell of the tank.

After the two assemblies 122 and 123 are completed, the two inner sections 47—47 of the lower extrusion 7 are butt welded as at 48 (FIGURES 10 and 11) to provide a one-piece prefabricated unit, which may be wrapped about the internal circular components of the vessel. As detailed in FIGURE 11, the two inner sections 47 of the lower section are clamped with their adjoining edges in abutment by means of a fixture 124, which engage the ribs 56 of the extruded sections. After the longitudinal welded seam 48 is applied, the prefabricated unit, consisting of the assemblies 122 and 123, are wrapped around the baffles 93, bulkheads 41 and end closures 11 and 12, which are welded in assembled relationship to the lower extrusion.

After the pre-assembled side wall panels and extruded sections are wrapped around the circular components to form the cylindrical shell (FIGURE 13), the central section 65 of the top extrusion 6 is placed in position. Suitable clamping fixtures (not shown) are placed across the top flanges 69 of the upper extruded section so as to draw the assembled shell structure under tension about the components of the vessel. In order to properly locate the sections of the top extrusion, spacers 125 may be placed between the top flanges 69, as shown in FIGURE 12. The longitudinal welds 68 are then applied to complete the major assembly operation.

It is also to be observed that the advantages provided by the technique illustrated in FIGURE 11 may be employed to facilitate the welding together of longitudinal extrusions which in and of themselves may be relatively narrow but are adjoined in edge-to-edge relationship to build up a shape of any given width. Thus, extrusions 47—47 are provided respectively with ribs 56—56. These ribs are spaced predetermined distances from the edges at which the extrusions are to be adjoined. Each rib, in the preferred method which is disclosed, presents a face which is substantially perpendicular to the plane of the extrusion and the face which is angulated relative to the plane of the extrusion, i.e. each rib may be of half-dovetail shape in cross section. For precision of shape of the assembly to be produced in the welding together of such extrusions, the welding fixture shown in FIGURE 11 includes a block 126 extending preferably the length of the extrusions. The width of block 126 is such that when the shoulder faces of the ribs 56 are in abutment with the opposite edges of the block 126, the edgewise extremities of the respective extrusions 47—47 will be positioned accuratley throughout their length a distance best suited to receive welding metal at the seam 48. As shown in FIGURE 11, the upper face of the alignment bar 126 may be grooved longitudinally to provide clearance below the line of welding. By utilizing extrusions having chamfered longitudinal edges, a V-groove is provided when the extrusions are arranged adjacent one another and this groove may be utilized as a guide track for a self-moving automatic welding machine. The vertical faces of the guide block thus accurately position the extrusions longitudinally adjacent one another.

The angulated faces of the ribs 56, oppositely disposed with respect to one another operate in conjunction with the upper face of guide bar 126 to establish alignment of the extrusions in their lateral direction. Thus, as the clamp blocks 124, either one or both are moved toward one another the ribs 56 are not only brought into engagement with the opposite sides of the guide bar 126, but the extrusions 47—47 are moved downwardly against the upper face of the guide bar 126. This face of the guide bar may be configurated in cross section to the curvature or radius of shape which is desired in the finished assembly. The upper surfaces of the clamp blocks 124 also may be of complementary configuration to lend additional support to the extrusions during welding if desired. In regard to this feature of the present invention, the extrusions may or may not additionally include ribs other than ribs 56 for imparting longitudinal stiffness to the extrusions. These aspects of the present invention are disclosed and claimed in our co-pending application Serial No. 104,641, filed April 21, 1961, for Valving System for Vessels, now Patent No. 3,187,766.

While the present invention is disclosed in the drawings as an embodiment adapted particularly for transportation usage, suspension structure may be omitted from the arrangement, adapting the vessel particularly to convenient usage as a bulk lading container readily suited either for stationary storage purposes or for detachable engagement with transport units such as wheeled railway or roadway vehicles including flat bed vehicles of either type. The side channels at the bottom form convenient guides for reception or interlocking engagement with members of the vehicle, and the vessel readily may be lifted by slings or equipped with hooks and eyes for that purpose. It is also to be noted that the vessels of such construction readily may be stacked one upon another as in ship loading operations; for this purpose, to obtain best vertical load distribution within the structure it is desirable that either the side channels 50 or intermediate ribs such as rib 52 of the bottom beam construction be arranged substantially in vertical alignment with the top rails 69 of the top beam.

Having described our invention, we claim:

A method of forming an elongated wall member of predetermined width dimension from longitudinal extrusions each having a width lesser than said predetermined dimensions, each of said extrusions having an integral rib projecting laterally therefrom in uniform spacing from an edge of the extrusion and presenting at least one face defining an acute angle with respect to an adjacent portion of the extrusion, which method comprises placing said extrusions adjacent one another upon a guide bar with one face of the rib of each extrusion against a respective edge face of the guide bar, then exerting clamping pressure across the opposite faces of the said ribs and conjointly through the angulation of the said angulated faces of said ribs pulling said extrusions downwardly upon the face of said guide bar, whereby the width of the guide bar against which the said ribs are urged establishes the longitudinal alignment of said extrusions and the pull-down engagement of the extrusions with the face of the guide bar establishes that lateral alignment throughout their length, then seam welding the extrusions one to another along their adjacent edges while they are so aligned.

No references cited.

JOHN F. CAMPBELL, *Primary Examiner.*